April 1, 1924.
C. E. WHITE
DISK SCRAPER
Original Filed Nov. 22, 1918
1,488,520
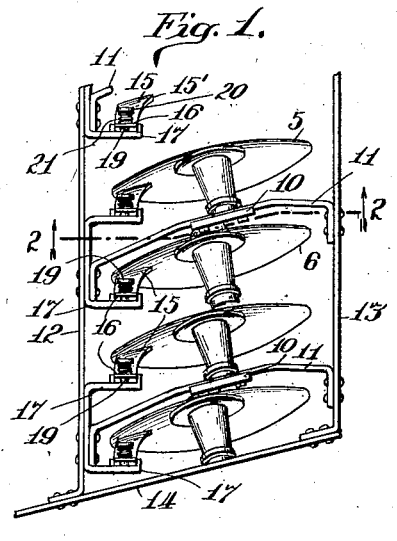
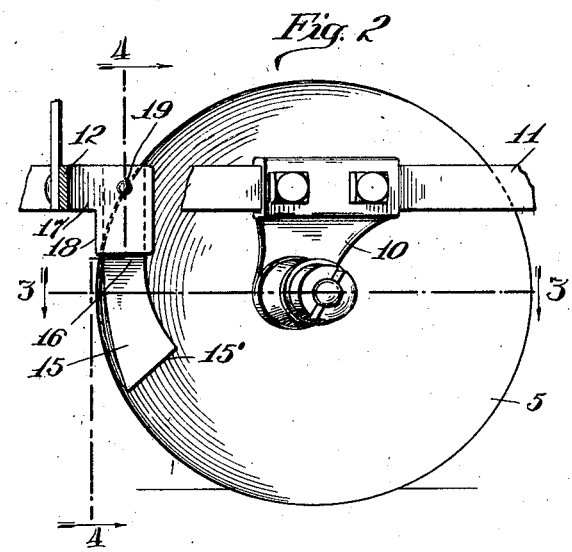
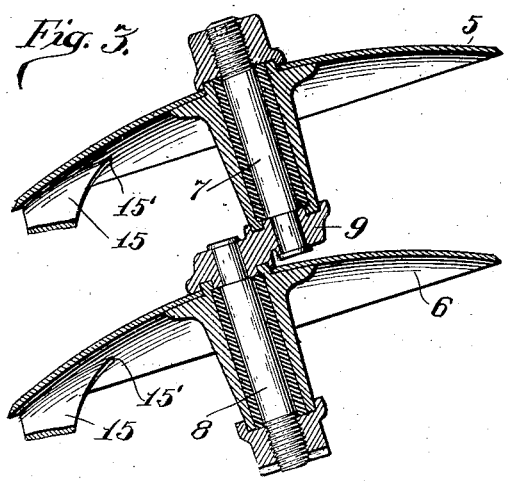
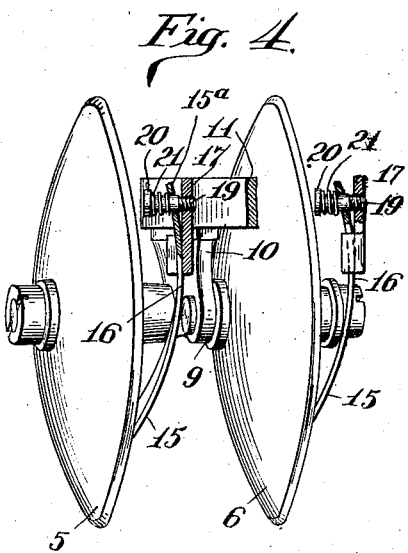
Inventor.
Charles E. White,
By Adams & Jackson
Attorneys
Witness
Milton Lenoir Patented Apr. 1, 1924.

1,488,520

UNITED STATES PATENT OFFICE.

CHARLES E. WHITE, OF MOLINE, ILLINOIS, ASSIGNOR TO DEERE & COMPANY, OF MOLINE, ILLINOIS, A CORPORATION OF ILLINOIS.

DISK SCRAPER.

Original application filed November 22, 1918, Serial No. 263,699. Divided and this application filed September 24, 1921. Serial No. 502,983.

*To all whom it may concern:*

Be it known that I, CHARLES E. WHITE, a citizen of the United States, and a resident of Moline, in the county of Rock Island and State of Illinois, have invented certain new and useful Improvements in Disk Scrapers, of which the following is a specification, reference being had to the accompanying drawings.

My invention relates to scrapers commonly employed in connection with the disks of tillage implements such as disk plows, disk harrows, etc., and has for its object to provide improved means for mounting the scraper so that it will yieldingly engage the face of the disk, and may readily be adjusted to vary the pressure of the scraper against the disk. I accomplish this object as illustrated in the drawings and as hereinafter described. What I regard as new is set forth in the claims.

In the accompanying drawings,— in which I have illustrated the application of my invention to the scraper of a tilling implement such as that shown and described in my pending application, Serial No. 263,699, filed November 22, 1918, of which application this is a division,—

Fig. 1 is a partial plan view of a gang of disks;

Fig. 2 is an enlarged vertical section on line 2—2 of Fig. 1 showing a disk and scraper in elevation;

Fig. 3 is a horizontal section on line 3—3 of Fig. 2; and

Fig. 4 is a vertical section on line 4—4 of Fig. 2.

In the drawings I have shown disks 5, 6 arranged in pairs and mounted on spindles 7, 8 respectively, which extend substantially parallel with each other and are secured to and extend in opposite directions from a head 9 which is provided with a standard 10 by which the pair of disks are secured to a suitable support. By this construction the disks of each pair are in staggered relation to each other as shown in Figs. 1 and 3. The standard 10 is adapted to be secured to a cross-bar 11, the ends of which are connected to parallel bars 12, 13 which are connected not only by the bars 11 but also by side bars 14, thus constituting a frame in which the gang of disks is mounted, as described in my said pending application. It should be understood, however, that so far as my present invention is concerned the specific manner in which the disks are mounted is not material, as any suitable construction for the purpose may be employed.

Reference numeral 15 indicates the scraper with which my present application has principally to do. As best shown in Figs. 2 and 4, each of these scrapers, which are made of elastic metal plates, has an edge 15' adapted to bear against the face of the disk, and a rounded portion or shank 16 by which the scraper is attached to its support. The curved upper end of the shank forms in effect a laterally-extending arm 15ª by means of which pressure is applied to the scraper in such manner as to tend to rock it on its rounded intermediate portion in the manner and for the purpose hereinafter described. In the construction shown the scraper support consists of a U-shaped bracket 17 having a downwardly-extending portion 18 against which the rounded upper portion of the scraper shank 16 bears, so that it forms a fulcrum upon which the scraper may rock or swing after the manner of a rocking lever. The upper end portion or laterally extending arm 15ª of the scraper shank 16 is perforated to receive a bolt 19 screwed into the bracket 17 and provided with a head 20. Between this head and the scraper shank a spring 21 is mounted on the bolt 19, as best shown in Fig. 4, so that said spring tends to press the upper end of the scraper toward the bracket 17 and thereby to cause it to rock upon its fulcrum so as to press the edge 15' of the scraper against the face of the disk. By adjusting the bolt 19 the normal pressure of the scraper against the disk may, of course, be varied, but aside from such adjustment the tension of the spring 21 serves to hold the scraper yieldingly in engagement with the disk.

The object of making the brackets 17 U-shaped as described, is to enable each of said brackets to accommodate the scrapers of two adjacent disks, as shown in Fig. 1, and when that arrangement is used the brackets 17 are secured to the bar 12 of the frame. It should be understood, however, that my invention is not limited to this construction, as any suitable means by which a fulcrum is provided for the rounded intermediate portion of the scraper, and the upper end portion or laterally extending arm of the scraper provided with means tending to rock it on its fulcrum may be employed.

What I claim as my invention and desire to secure by Letters Patent, is—

1. The combination with a disk, of a scraper support, a scraper having a rounded bearing surface adapted to bear on said support, and means for applying pressure to said scraper at one side of said bearing surface for causing it to rock on said support and press against the disk.

2. The combination with a disk, of a scraper support, a scraper having a rounded bearing surface adapted to bear on said support, and means yieldingly engaging said scraper at one side of said bearing surface for causing it to rock on said support and thereby press against the disk.

3. The combination with a disk, of a scraper support, a scraper having a rounded bearing surface adapted to bear on said support, a bolt carried by said support, and a spring mounted on said support and engaging said scraper at one side of the bearing surface thereof, whereby said spring tends to rock said scraper on said support.

4. The combination with a disk, of a scraper having a curved shank, a bolt upon which said shank is mounted, a bracket for supporting said bolt, and a spring mounted upon said bolt and tending to press said shank toward said bracket to cause the edge of the scraper to bear against the disk.

5. The combination with a disk, of a scraper having a curved shank, an adjustable bolt upon which said shank is mounted, a bracket for supporting said bolt and forming an intermediate bearing for the scraper, and a spring mounted upon said bolt and tending to press said shank against said bracket to vary the pressure of the scraper against the disk.

6. In combination, a framework, a disk rotatably mounted with respect to said framework, a scraper having a laterally-rounded bearing surface at its upper end, and means connecting said scraper with said framework serving to permit said scraper to roll sidewise on said rounded surface toward and away from the face of the disk.

7. In combination, a framework, a disk rotatably mounted with respect to said framework, a scraper comprising a laterally-extending arm having a rounded portion of its surface that contacts therewith, and means securing said arm to said framework adapted to permit the scraper to roll on said rounded surface portion for swinging its blade portion toward and away from said disk.

8. In combination, a framework, a disk rotatably mounted with respect to said framework, a scraper comprising a laterally-extending arm having a rounded portion of its surface that contacts therewith, and means securing said arm yieldingly in position on said framework and serving to hold said scraper normally in contact with the face of the disk.

9. In combination, a framework, a disk rotatably mounted with respect to said framework, a scraper comprising a laterally-extending arm having a rounded connection therewith, yielding means securing said arm in position on said framework and serving to hold the scraper normally in contact with the face of the disk, and means for adjusting said yielding means for increasing the pressure of said scraper on said disk.

10. In combination, a framework, a disk rotatably mounted with respect to said framework, a scraper comprising a laterally-extending arm having a rounded connection therewith, a bolt passing through said arm and a portion of said framework, a coiled spring interposed between said arm and the head of said bolt adapted to press said scraper against the face of said disk, and means for adjusting the position of said bolt in said framework for increasing the pressure of said scraper on said disk.

CHARLES E. WHITE.